United States Patent [19]

Lange

[11] 4,358,516

[45] Nov. 9, 1982

[54] SODIUM ION CONDUCTOR, SOLID ELECTROLYTE STRENGTHENED WITH ZIRCONIA

[75] Inventor: Frederick F. Lange, Thousand Oaks, Calif.

[73] Assignee: Rockwell International Corporation, El Segundo, Calif.

[21] Appl. No.: 311,853

[22] Filed: Oct. 16, 1981

[51] Int. Cl.$^3$ ............................................ H01M 10/39
[52] U.S. Cl. .................................. 429/193; 501/153; 204/195 S
[58] Field of Search ................ 429/191, 193, 33, 104; 204/195 S; 501/102, 153

[56] References Cited

U.S. PATENT DOCUMENTS

| 3,895,963 | 7/1975 | McGowan et al. | 429/193 |
|---|---|---|---|
| 4,166,159 | 8/1979 | Pober | 429/193 |
| 4,221,650 | 9/1980 | Friese et al. | 204/195 S |
| 4,298,385 | 11/1981 | Claussen et al. | 501/153 |
| 4,322,249 | 3/1982 | Claussen et al. | 501/153 |

OTHER PUBLICATIONS

May et al., Recent Progress in The Development of Beta-Alumina For the Sodium-Sulphur Battery, Electrochimica Acta, vol. 24, pp. 755-763, 1979.

*Primary Examiner*—Donald L. Walton
*Attorney, Agent, or Firm*—H. Fredrick Hamann; Craig O. Malin

[57] ABSTRACT

Fracture toughness and strength of $\beta$-Al$_2$O$_3$, $\beta''$-Al$_2$O$_3$, and Na$_{1+x}$Zr$_2$Si$_x$P$_{3-x}$O$_{12}$ solid electrolytes are increased by incorporating metastable grains of tetragonal ZrO$_2$ in the structure. The ZrO$_2$ occupies from 5 to 40% of the volume of the ceramic. To enable retention of the metastable tetragonal structure at room temperature, the ZrO$_2$ has a grain size less than about 2 $\mu$m and has dissolved in it a rare earth oxide such as Y$_2$O$_3$, CeO$_2$, La$_2$O$_3$ and/or Er$_2$O$_3$.

11 Claims, No Drawings

SODIUM ION CONDUCTOR, SOLID ELECTROLYTE STRENGTHENED WITH ZIRCONIA

BACKGROUND OF THE INVENTION

This invention relates to the field of ceramics and particularly to the field of solid electrolytes.

Sodium electrolyte materials such as $\beta$-$Al_2O_3$, $B''$-$Al_2O_3$, and $Na_{1+x}Zr_2Si_xP_{3-x}O_{12}$ are ceramics that are capable of conducting electricity because their crystal structures include a sodium ion ($Na^+$) conductor. Consequently, they are of great interest for use in high energy density, high power density batteries such as sodium sulfur batteries which require conductive ceramics.

Unfortunately, these conductive ceramics are weak, and strength degradation during their use leads to reduced battery lifetime. Surface cracks in the ceramic electrolyte can cause current focusing during battery charging which accellerates the crack growth and leads to degradation. Structural failure of the ceramic due to external stresses can lead to catastrophic sodium sulphur reactions.

Thus, these new high performance batteries need stronger conductive ceramics in order to improve their reliability, increase their current density, and allow the use of thinner-wall electrolytes.

SUMMARY OF THE INVENTION

It is an object of the invention to provide an improved sodium ion conductor, solid electrolyte.

It is an object of the invention to provide a stronger $\beta$-$Al_2O_3$ ceramic.

It is an object of the invention to provide a stronger $\beta''$-$Al_2O_3$ ceramic.

It is an object of the invention to provide a stronger $Na_{1+x}Zr_2Si_xP_{3-x}O_{12}$ ceramic.

According to the invention, the fracture toughness and strength of three solid electrolytes ($\beta$-$Al_2O_3$, $\beta''$-$Al_2O_3$, and $Na_{1+x}Zr_2Si_xP_{3-x}O_{12}$) are increased by incorporating grains of tetragonal $ZrO_2$ in the structure. During cracking, the stress field around the crack tip causes the tetragonal $ZrO_2$ to transform to the monoclinic structure which is the stable form at room temperature. This transformation increases the energy required for the crack to propagate and thereby retards its growth, resulting in a stronger and tougher material.

$ZrO_2$ is added to the solid electrolyte in the amount of from 5 to 40% of the volume. To retain its metastable tetragonal structure at room temperature rather than its equilibrium stable monoclinic structure, the grain size of the $ZrO_2$ is kept less than about 2 $\mu$m.

Additionally, a rare earth oxide such as $Y_2O_3$, $CeO_2$, $La_2O_3$ and/or $Er_2O_3$ is included in the composition. These oxides are dissolved in the $ZrO_2$. A sufficient amount is included in the ceramic to insure the formation of the tetragonal structure in the constrained state at the expense of the stable monoclinic structure. However, large amounts of rare earth oxide produce a third form of $ZrO_2$, namely the cubic structure. The amount of rare earth oxide must be held below the quantity that produces the cubic structure.

These and other objects and features of the invention will be apparent from the following detailed description.

DESCRIPTION OF THE PREFERRED EMBODIMENT $\beta$-$Al_2O_3$ and $\beta''$-$Al_2O_3$ are sodium aluminates. $\beta$-$Al_2O_3$ has a composition range defined by $Na_2O$-$Al_2O_3$ phase diagrams. The $\beta$-$Al_2O_3$ phase crystallizes in thin hexagonal plates and has a lower ratio of $Na_2O$ to $Al_2O_3$, for example 1 $Na_2O$.9 $Al_2O$. The $\beta''$-$Al_2O_3$ has a rhombohedral crystal structure and has a higher ratio of $Na_2O$ to $Al_2O_3$. Additionally, the $\beta''$-$Al_2O_3$ has a third ingredient such as $Li_2O$ or $MgO$ which tends to promote the $\beta''$ phase. Examples of $\beta''$-$Al_2O_3$ are ¼ $Li_2O$.1 $Na_2O$.5 $Al_2O_3$ and 1/6 $Li_2O$.1 $Na_2O$.6⅓$Al_2O_3$.

A more recently discovered sodium ion conductor, solid electrolyte has the general formula $Na_{1+x}Zr_2Si_xP_{3-x}O_{12}$. The preparation and properties for this electrolyte for $x=2$ ($Na_3Zr_2Si_2PO_{12}$, called nasicon) is described in an article in the American Ceramic Society Bulletin, Vol. 59, No. 5, May 1980 entitled "Phase Transformation in an $Na_3Zr_2Si_2PO_{12}$ Ceramic" by G. Desplanches, et al.

These three ceramics are sodium ion conductors and can be used as the electrolyte in sodium-sulphur batteries. However, they do not have sufficient mechanical strength to permit optium battery design and high operating reliability.

It has been discovered that these solid electrolytes can be strengthened by incorporating metastable grains of $ZrO_2$ in their microstructure. During cracking, the stress field around the crack tip causes the constrained tetragonal $ZrO_2$ to transform to the monoclinic structure which is the stable crystal structure of $ZrO_2$ at room temperature. This is called a stress-induced, martensitic transformation. This transformation increases the energy required for the crack to propagate and thereby increases the material's resistance to fracture.

Zirconium dioxide exists in three crystal forms, the cubic form which is stable at very high temperatures, the tetragonal form which is also stable at high temperatures, and the monoclinic form which is stable at low temperatures. According to the present invention, the $ZrO_2$ must be in the metastable tetragonal form rather than in the monoclinic form normally obtained during cooling after sintering or annealing the ceramic. To accomplish this, the grain size of the $ZrO_2$ is kept below about 2 $\mu$m and a rare earth oxide is added to the composition.

By keeping the grain size small, retention of the metastable tetragonal structure is promoted by the strain energy arising from the elastic constraint imposed by the surrounding material on the transformation volume and shape change. The transformation of $ZrO_2$ from the high temperature tetragonal structure to the low temperature monoclinic structure involves a large shear strain and a substantial volume increase. If the individual grains of $ZrO_2$ are small, then they tend to remain in the stable high temperature tetragonal form during cooling of the ceramic because the surrounding matrix constrains their expansion and shape change which is required to form new monoclinic grains. Theoretical calculations by the present inventor (F. F. Lange, "Stress-Induced Phase Transformation: Theory of Phase Retention and Fracture Toughness," Office of Naval Research Report #6, Contract N00014-77-C-0441, October, 1979) explain in greater detail the relationship between grain size, the restraining matrix, and the retention of the tetragonal phase of $ZrO_2$.

When rare earth oxides are added to the ceramic, they are held in solid solution in the $ZrO_2$ grains. This increases the critical grain size required to retain the tetragonal $ZrO_2$ in the matrix. Consequently, tetragonal $ZrO_2$ containing a rare earth additive can be retained in the solid electrolyte matrix with grain sizes up to about 2 μm. Without the rare earth additive, such large grains would normally transform to the monoclinic structure when the ceramic is cooled from its fabrication temperature.

$Y_2O_3$ is one of a family of 16 rare earth oxides. Actual tests have shown that $Y_2O_3$ does promote the retention of tetragonal $ZrO_2$. A comparison of the phase diagrams ("Phase Diagrams for Ceramist", complied by the National Bureau of Standards and published by The American Ceramic Society) of $ZrO_2$—$Y_2O_3$ with $ZrO_2$—$CeO_2$, with $ZrO_2$—$Er_2O_3$, and with $ZrO_2$—$La_2O_3$ shows similar behavior in that these four metal oxides each tend to lower the temperature of the transformation of $ZrO_2$ from the tetragonal to the monoclinic structure. It is therefore concluded that the addition of $CeO_2$, $Er_2O_3$, or $La_2O_3$ to the $ZrO_2$ would also favor the retention of tetragonal $ZrO_2$ in a manner analogous to the $Y_2O_3$ addition. As in the case of $Y_2O_3$, the amount added must be sufficient to cause the retention of tetragonal $ZrO_2$, but not so much as to cause the formation of substantial amounts of cubic $ZrO_2$. According to actual tests with $Y_2O_3$ and to the phase diagrams, $Y_2O_3$ is beneficial in the range of about 2 to 5.5 m/o, $CeO_2$ is beneficial in the range of about 3 to 20 m/o, $Er_2O_3$ is beneficial in the range of about 1 to 4 m/o, and $La_2O_3$ is beneficial in the range of about 2 to 5 m/o. Mole percent is defined as:

$$\frac{100 \times \text{moles of rare earth oxide}}{\text{moles of rare earth oxide} + \text{moles of } ZrO_2}.$$

Mixtures of $Y_2O_3$, $CeO_2$, $Er_2O_3$, and $La_2O_3$ can be added in various portions within the above ranges to promote the tetragonal $ZrO_2$.

The composition of the matrix can range from 5 to 40 v/o $ZrO_2$ (including the rare earth oxide dissolved therein) with the balance being one or more of the above mentioned solid electrolytes. The upper limit of $ZrO_2$ is the maximum amount of $ZrO_2$ which can be included in the ceramic without eliminating continuous sodium ion conducting phases in the ceramic. Above this limit, there will be a large increase in resistivity. This limit is estimated to be about 40 v/o $ZrO_2$.

Volume percentages of $ZrO_2$ on the high side of the range will produce stronger ceramics, but the resistivity of the ceramic will be lower. Thus, there is a trade-off between strength and resistivity that requires the selection of a composition which gives the optimum combination of properties for a particular battery design.

The following are examples of methods which can be used to fabricate the ceramic composition according to the invention.

EXAMPLE I

MIXED OXIDES $NaHCO_3$, $LiOH$, $Al_2O_3$, $Y(NO_3)_3$, and $ZrO_2$ were mixed together in quantities sufficient to produce a first phase of $\beta''$—$Al_2O_3$ occupying 85 v/o of the ceramic and a second phase of $ZrO_2$ occupying 15 v/o of the ceramic. The ingredients were proportional to yield $\beta''$—$Al_2O_3$ having a composition of 1/6 $Li_2O.1$ $Na_2O.6\frac{1}{3}$ $Al_2O_3$ and $ZrO_2$ containing 3 m/o $Y_2O_3$. The mixture was milled and calcined at 1200° C.

The calcined powders were handled under inert gas because it is necessary to control the moisture in the $\beta''$—$Al_2O_3$ powder in order to obtain predictable sintering characteristics. The powders were isostatically pressed at $\geq 30,000$ psi and then were sintered at 1600° C. to $>95\%$ of theoretical density.

X-ray analysis showed that this material contained a mixture of $\beta$—$Al_2O_3$ and $\beta''$—$Al_2O_3$ (about 50/50) plus tetragonal $ZrO_2$. The average flexural strength of this material was $50,300 \pm 6,500$ psi (350 MPa). Its average value of $K_c$ (stress intensity factor) was 5.63 MPam$^{\frac{1}{2}}$. This compares with reported values for $\beta''$—$Al_2O_3$ (without $ZrO_2$) of less than 32,000 psi (220 MPa) for flexural strength and 2.63 for $K_c$.

The resistivity of the sample prepared per Example I was as shown in Table I below. For comparison, the resistivity of a commercially available sample of $\beta''$—$Al_2O_3$ (without $ZrO_2$) is shown. For battery applications, a resistivity less than 10 ohm cm at 300° C. is generally considered satisfactory.

TABLE I

| | RESISTIVITY, ohm cm | | |
|---|---|---|---|
| | 250° C. | 300° C. | 350° C. |
| Example I, $\beta''$-$Al_2O_3$ + 15 v/o $ZrO_2(t)$ | 11.0 | 7.7 | 5.9 |
| Commercially available $\beta''$-$Al_2O_3$ | 5.0 | 3.7 | 3.1 |

EXAMPLE II

SOL-GEL+$ZrO_2$

Examples II-VI utilize a sol-gel technique to produce amphorous powders which directly crystallize to form $\beta''$—$Al_2O_3$ upon heating to temperatures above 1200° C. Gel derived powders have high surface area and must be handled carefully. They should be handled under inert gas and their moisture content carefully controlled in order to obtain proper sintering characteristics. When done properly, the sol-gel technique should produce a better dispersed $ZrO_2(t)$ second phase with a finer grain size.

Separate aqueous solutions were prepared of soluble $NaHCO_3$ and $LiOH$. These solutions were blended into an $Al(OH)_3$ isopropanol slurry in proper sequence to form a sol-gel upon setting. The proportions of the ingredients were selected so that after dehydration and calcination at 900° C., $\beta''$—$Al_2O_3$ was produced having a composition of 1/6 $Li_2O.1$ $Na_2O.6\frac{1}{3}$ $Al_2O_3$.

The $\beta''$—$Al_2O_3$ produced by the sol-gel technique was mixed by milling with $ZrO_2$ plus $Y(NO_3)_3$ to produce 3 m/o $Y_2O_3$ upon decomposition of the nitrate to the oxide. The mixed powders were isostatically pressed at $\geq 30,000$ psi and then sintered at 1600° C. to produce a $\beta''$—$Al_2O_3$+15 v/o $ZrO_2(t)$ ceramic having over 95% theoretical density. The $ZrO_2$ in the resulting ceramic was substantially 100 v/o tetragonal.

EXAMPLE III

SOL-GEL+$ZrO_2$

A sample was prepared as described in Example II above except that sufficient $Y(NO_3)_3$ to produce 1 m/o $Y_2O_3$ was included. The resulting $ZrO_2$ was substantially 100% monoclinic, thus indicating that 1 m/o $Y_2O_3$ is not sufficient to provide the desired tetragonal $ZrO_2$ structure.

EXAMPLE IV

SOL-GEL+$ZrO_2$

A sample was prepared as described in Example II above except that sufficient $Y(NO_3)_3$ to produce 2 m/o $Y_2O_3$ was included. About 60 v/o of the $ZrO_2$ in the resulting ceramic was tetragonal with the remaining 40 v/o being monoclinic, indicating that the amount of $Y_2O_3$ in the sample was on the low side of the desired range.

EXAMPLE V

SOL-GEL+$ZrO_2$

A sample was prepared as described in Example II above except that sufficient $Y(NO_3)_3$ to produce 4 m/o $Y_2O_3$ was included. The $ZrO_2$ in the resulting ceramic was substantially 100 v/o tetragonal. There appeared to be a trace amount of cubic $ZrO_2$ in the sample indicating that the amount of $Y_2O_3$ in the ceramic was approaching the high side of the allowable range.

EXAMPLE VI

TOTAL SOL-GEL

Separate aqueous solutions were prepared of soluble $NaHCO_3$, $LiOH$, and $Zr(NO_3)_4$ plus $Y(NO_3)_3$. These solutions were blended into an $Al(OH)_3$ isopropanol slurry in proper sequence to form a sol-gel upon setting. The sol-gel was directly crystallized to $\beta''$—$Al_2O_3$ plus tetragonal $ZrO_2$ by heating above 1200° C.

The composite powders were handled in inert gas after calcining, ground to minimize aggregation, isostatically pressed at $\geq$30,000 psi into discs and sintered at 1480° C. to produce a $\beta''$—$Al_2O_3$+15 v/o $ZrO_2(t)$ ceramic having a density over 95% of theoretical.

The above examples are illustrative of methods which can be used to produce the ceramic which is defined by the attached claims. The proportion of ingredients required to produce various compositions of $\beta$—$Al_2O_3$, $\beta''$—$Al_2O_3$, and $Na_{1+x}Zr_2Si_xP_{3-x}O_{12}$ can be readily determined using known chemical relationships. Similarly, the volume percent of $ZrO_2$ in the final ceramic can be varied from 5 to 40 v/o by simply using the proper proportion of $ZrO_2$, $Zr(NO_3)_4$, or other suitable ZrO containing ingredients. Accordingly, it should be clearly understood that the form of the invention described above is illustrative only and is not intended to limit the scope of the invention.

What is claimed is:

1. A ceramic comprising:
    5 to 40 v/o $ZrO_2$ in the form of crystalline grains having a diameter less than about 2 $\mu$m and having a substantially tetragonal structure;
    a rare earth oxide selected from the group consisting of $Y_2O_3$, $CeO_2$, $Er_2O_3$, and $La_2O_3$, there being at least enough of said rare earth oxide to increase the amount of $ZrO_2$ having a tetragonal crystal structure, but not enough of said rare earth oxide to form substantial amounts of said $ZrO_2$ having a cubic crystal structure; and
    the remainder of said ceramic being substantially a sodium ion conductor solid electrolyte selected from the group consisting of $\beta$—$Al_2O_3$, $\beta''$—$Al_2O_3$, and $Na_{1+x}Zr_2Si_xP_{3-x}O_{12}$.

2. The ceramic as claimed in claim 1 wherein said rare earth oxide comprises 3 to 20 m/o $CeO_2$.

3. The ceramic as claimed in claim 1 wherein said rare earth oxide comprises 1 to 4 m/o $Er_2O_3$.

4. The ceramic as claimed in claim 1 wherein said rare earth oxide comprises 2 to 5 m/o $La_2O_3$.

5. The ceramic as claimed in claim 1, wherein said sodium ion conductor solid electrolyte comprises a mixture of $\beta$—$Al_2O_3$ and $\beta''$—$Al_2O_3$.

6. A ceramic comprising:
    5 to 40 v/o $ZrO_2$ in the form of crystalline grains having a diameter less than about 2 $\mu$m and having a substantially tetragonal structure;
    about 2.5 m/o $Y_2O_3$; and
    the remainder of said ceramic being substantially $\beta$—$Al_2O_3$.

7. A ceramic comprising:
    5 to 40 v/o $ZrO_2$ in the form of crystalline grains having a diameter less than about 2 $\mu$m and having a substantially tetragonal structure;
    about 2.5 m/o $Y_2O_3$; and
    the remainder of said ceramic being substantially $\beta''$—$Al_2O_3$.

8. A ceramic comprising:
    5 to 40 v/o $ZrO_2$ in the form of crystalline grains having a diameter less than about 2 $\mu$m and having a substantially tetragonal structure;
    about 2.5 m/o $Y_2O_3$; and
    the remainder of said ceramic being substantially $Na_{1+x}Zr_2Si_xP_{3-x}O_{12}$.

9. The ceramic as claimed in claim 8 wherein said $Na_{1+x}Zr_2Si_xP_{3-x}O_{12}$ comprises $Na_3Zr_2Si_2PO_{12}$.

10. A ceramic comprising:
    5 to 40 v/o $ZrO_2$ in the form of crystalline grains having a substantially tetragonal structure and having a diameter less than about 2 $\mu$m;
    2 to 5.5 m/o $Y_2O_3$; and
    the remainder of said ceramic being substantially a sodium ion conductor solid electrolyte selected from the group consisting of $\beta$—$Al_2O_3$, $\beta''$—$Al_2O_3$, and $Na_{1+x}Zr_2Si_xP_{3-x}O_{12}$.

11. A two phase ceramic comprising:
    a first phase occupying 5 to 40 o/o of the volume of said ceramic, said first phase comprising $ZrO_2$ grains having a diameter less than about 2 $\mu$m with a rare earth oxide dissolved therein, said $ZrO_2$ having a tetragonal structure, said rare earth oxide being selected from the group consisting of $Y_2O_3$, $CeO_2$, $La_2O_3$, and $Er_2O_3$; and
    a second phase comprising a sodium ion conductor solid electrolyte selected from the group consisting of $\beta$—$Al_2O_3$, $\beta''$—$Al_2O_3$, and $Na_{1+x}Zr_2Si_xP_{3-x}O_{12}$, said second phase occupying substantially all remaining volume of said ceramic.

* * * * *